United States Patent

Triggs et al.

[11] Patent Number: 5,226,686
[45] Date of Patent: Jul. 13, 1993

[54] SAFETY GATE FOR SCHOOL BUS

[76] Inventors: Glenn A. Triggs, 604 White St., Watertown, Minn. 55388; Calvin C. Homola, R.R. 1, P.O. Box 815, Woonsocket, S. Dak. 57385

[21] Appl. No.: 921,046

[22] Filed: Jul. 28, 1992

[51] Int. Cl.$^5$ .................... B60R 19/02; B60Q 1/46
[52] U.S. Cl. .................... 293/117; 116/280; 296/1.1; 340/433
[58] Field of Search .......... 293/117; 296/1.1; 116/28 R; 340/433; 280/762; 180/271

[56] References Cited

U.S. PATENT DOCUMENTS

| | | | |
|---|---|---|---|
| 3,236,552 | 2/1966 | Percifull | 293/9 |
| 4,559,518 | 12/1985 | Latta | 340/130 |
| 4,697,541 | 10/1987 | Wicker | 116/28 R |
| 4,825,192 | 4/1989 | Wells | 340/433 |
| 4,956,630 | 9/1990 | Wicker | 340/433 |

*Primary Examiner*—Robert R. Song

[57] ABSTRACT

A safety gate for a school bus or similar conveyance. The gate is mounted on the front bumper of the vehicle and includes a barrier both in front of the bumper and between the bumper and the front wheel of the bus. Both barriers can be dropped from a travel height, in which the bus can travel on the roads, to a lower or guard height in which the barrier is close to the surface of the road so that people—particularly children—cannot go over or beneath the barriers in a location out of the view of the driver.

9 Claims, 4 Drawing Sheets

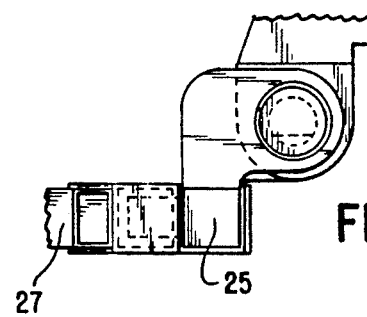
FIG. 7
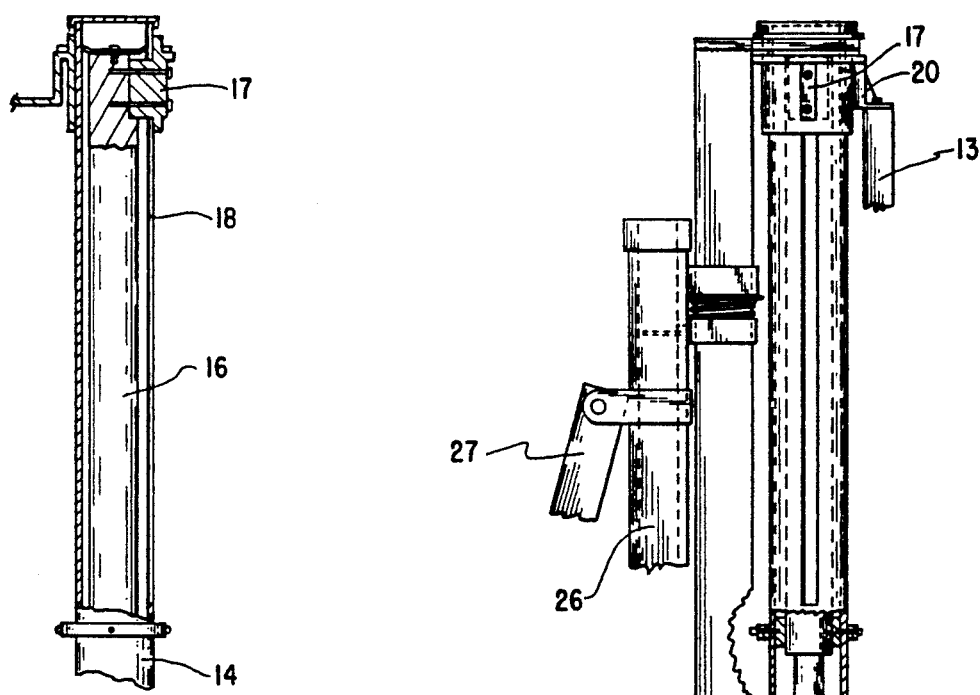
FIG. 8
FIG. 6

SAFETY GATE FOR SCHOOL BUS

BACKGROUND AND SUMMARY OF THE INVENTION

This invention pertains to pedestrian guards for vehicles, particularly vehicles such as buses for the conveyance of several people, in which a guard is adapted to prevent a person from walking in front of the vehicle into a blind spot for the driver.

Public conveyances, and especially school buses, are often built with an engine compartment extending some distance to the front of the driver's seat. Such a conformation creates a blind spot for the driver particularly in front of the front wheel opposite the driver's side. Thus, when a bus, particularly a school bus, stops to load or unload passengers, there may well be a time when a passenger is in front of that front wheel and can't be seen. There have been serious accidents by drivers who started the bus forward with people in such a position.

Gates extending from the bumper of the bus have been proposed. The gates is designed to swing out so that anyone in front of the bus is required to walk around the gate and thus be continuously within the view of the driver. However, in nearly all instances, the gates are simply swung out from the front bumper and extend as a bar at the same level as the bumper allowing enough space beneath the gate for an enterprising child to crawl under or sometimes low enough for that child to jump over in order to take a short cut. Also, the space between the bumper and the front wheel is left unguarded so that the same child may seek a shortcut through that space.

The present invention provides a gate which guards against both of those shortcomings in prior gates. It does this by providing for the dropping of the gate from a carried position to a lowered position when the gate is extended and by providing an auxiliary gate to cover the space between the front bumper and the front wheel.

BRIEF DESCRIPTION OF THE DRAWINGS

FIG. 6 is a detailed view of the mounting post with parts broken away to show operating mechanism, FIG. 7 is a top view of the post shown in FIG. 6, FIG. 8 is a partial view of the top of the post shown in FIG. 6 showing additional operating parts.

DESCRIPTION

Briefly, this invention comprises a safety feature particularly adaptable to school buses including a swing-out gate and an auxiliary gate designed to ensure that pedestrians do not walk so closely in front of the wheels of the bus as to be not visible to the driver.

Figures 1, 2:
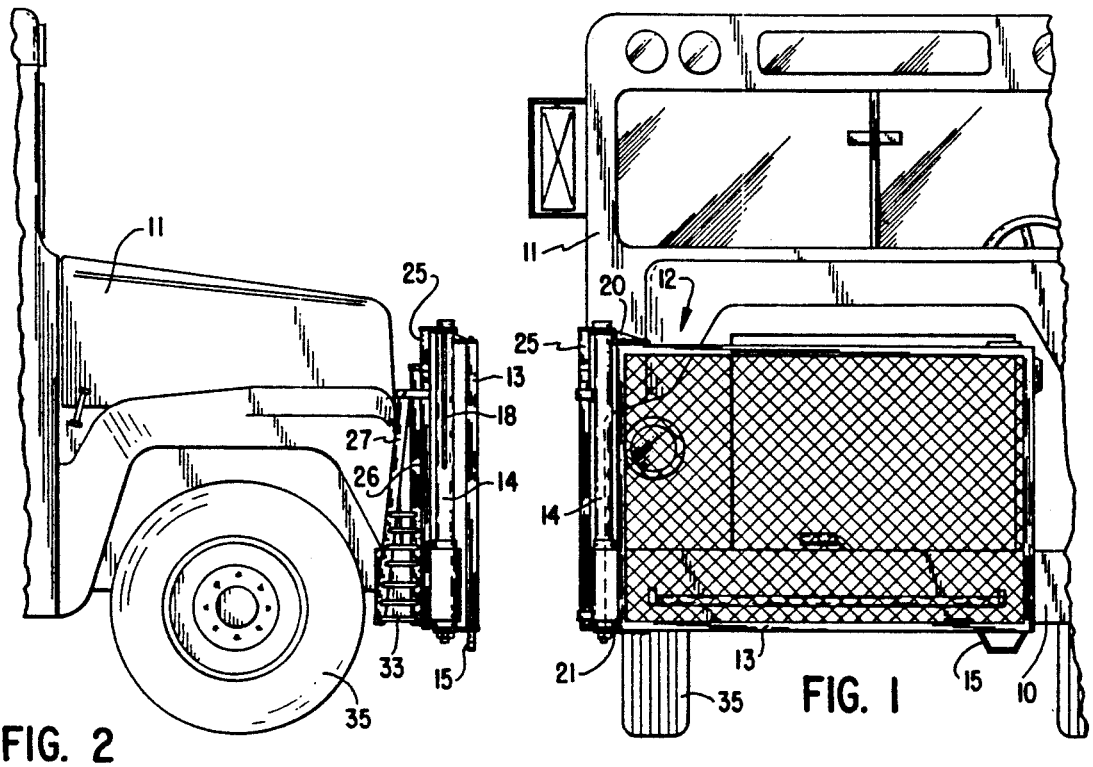
FIG. 1 is a front view of the gate of my invention mounted on the front of a school bus and shown in a carried position.
FIG. 2 is a side elevational view of the gate as in FIG. 1.

More particularly, and referring to the drawings, the device is intended to be mounted on the front bumper 10 on a school bus 11. The principal safety device is a swingable front gate 12 having a frame 13 mounted on a control post 14. As will appear in later description of the post, the gate can be swung outwardly from the carried position shown in FIGS. 1 and 2 to the guard position shown in FIG. 3 where the gate 12 extends substantially perpendicularly to the bumper 10. The gate, in the carried position, is also raised so that the bottom member of the frame 13 is at or near the lower edge of the bumper 10. In the guard position, the gate 12 is dropped nearly to the ground, and includes a support foot 15 adapted to rest on the surface and both support the gate 12 and restrict its movement.

Figure 3:
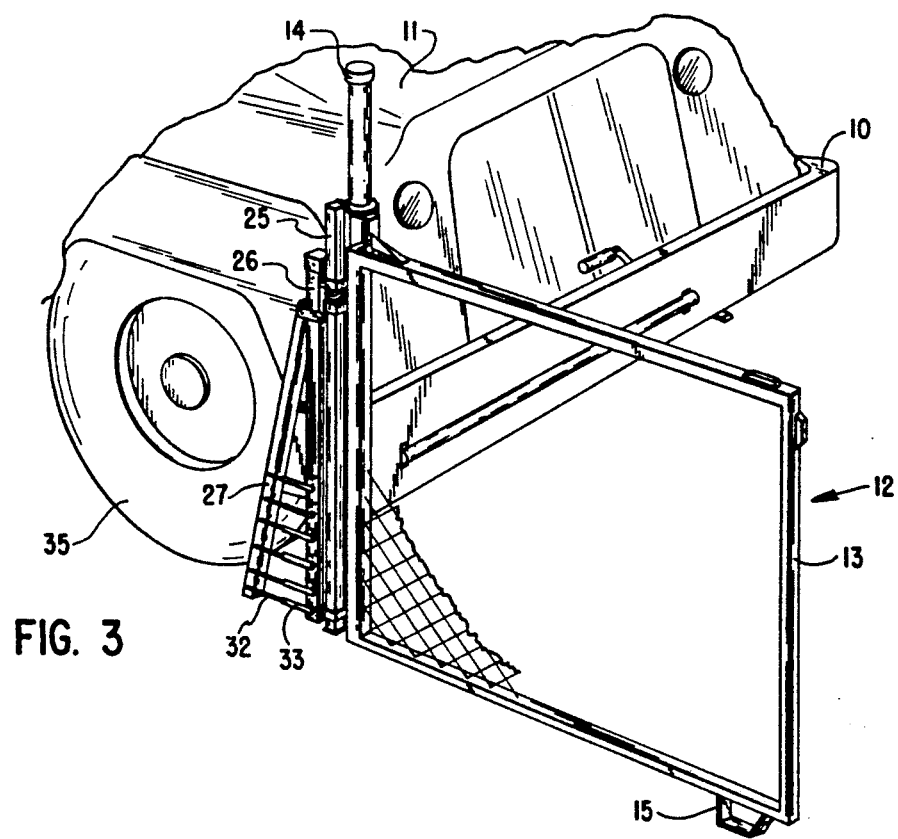
FIG. 3 is a perspective view of the mounted gate in the lowered and extended position.

The post 14 is pivotally mounted to the bumper 10 so that it can be rotated to carry the frame 13 through the 90° degree arc from its carried position (FIG. 1) to its extended position (FIG. 3). Within the post 14 a piston rod 16 is enclosed. This rod 16 is vertically slidable within the post 14 and may be moved in a vertical direction by hydraulic means in the post 14. A simple method would be simply to provide for a collar around the rod 16 to act as a piston while the interior of the post 14 acted as a cylinder. Hydraulic fluid under proper control could be introduced above and below the piston in ways well understood in the art to provide for raising and lowering the rod 16.

A key 17 running in a slot 18 formed in the top of the post 14 allows vertical movement of the rod 16 within the post 14 while constraining the rod to turn with the post. The frame 13 is secured to the rod 16 by flanges 20 and 21 at the top and bottom respectively. An arm 22 is attached to the bottom of the post 14 and is operated by a hydraulic piston-cylinder assembly 23 (FIGS. 6 and 9) to rotate the post 14.

Figures 4, 5:
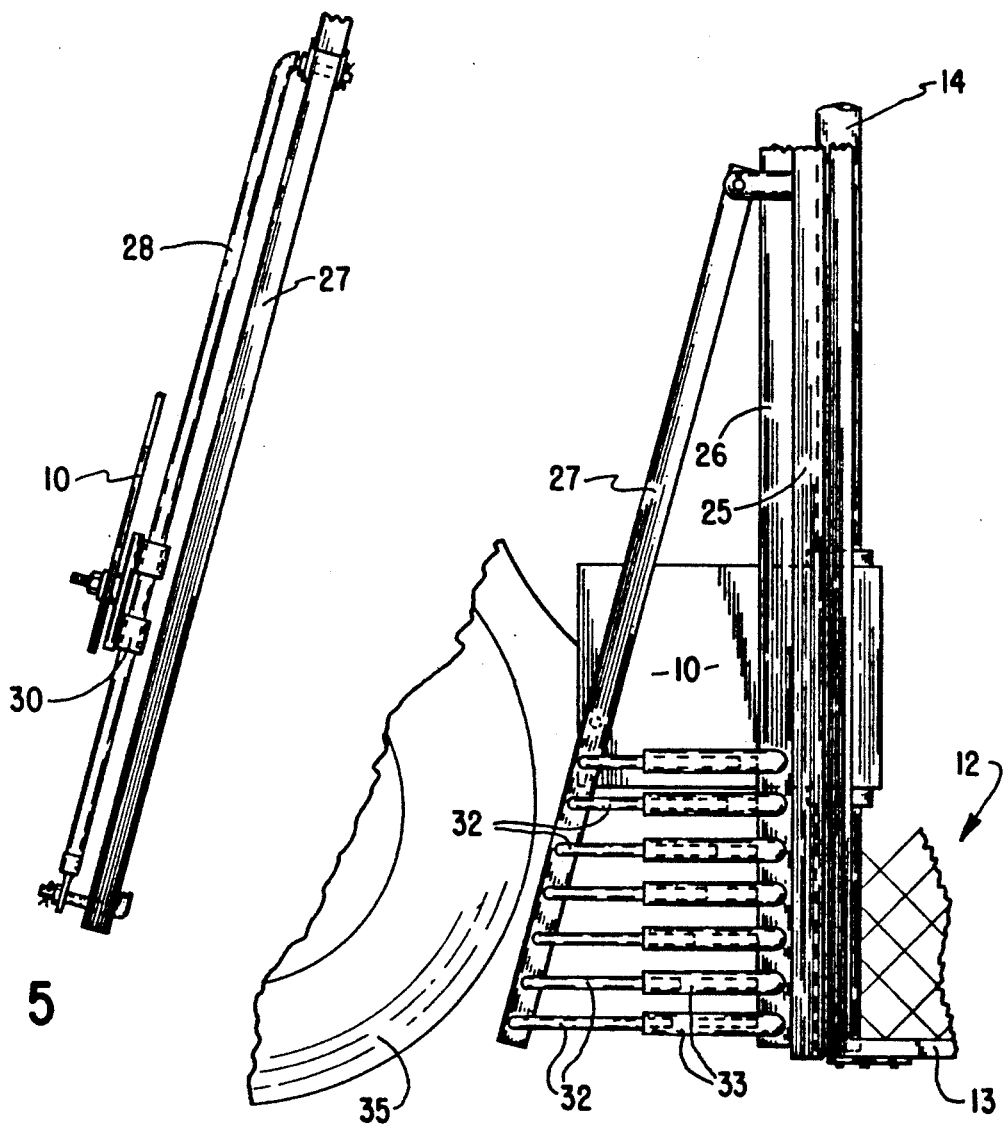
FIG. 4 is a detailed side elevational view of the extended position of the auxiliary gate.
FIG. 5 is a detailed edge view of the auxiliary gate showing some of the operating mechanism.

The auxiliary gate is mounted on a vertical post 25 which is fastened to and operated by the lifting rod 16 which also raises and lowers the principal gate. A carrying pillar 26 is removably mounted to the vertical post 25 for ease of servicing. The pillar 26 has a gate member 27 pivoted to it near the upper end. Parallel to the member 27 is a slide rod 28 (FIG. 5). This rod is fastened at both ends to the ends of the member 27 so that it is spaced from and parallel to the member 27.

The rod 28 is journalled in a slide 30 pivotally fastened to the bumper 10 (FIG. 5). Thus, the pivot axis of the slide 30 is always at a fixed distance from the pillar 26. However, as the pillar is raised from the position of FIG. 4, the member 27 will be pivoted toward the pillar 26 so that the bottom part of the member 27 is at the fixed distance from the pillar 26, just as the mid-part of the member 27 is spaced that distance when the auxiliary gate is lowered in a sort of spreading fan action.

To complete the barrier of the auxiliary gate, series of telescoping bars 32 adapted to slide into sockets 33 are pivotally connected to both the member 27 and the pillar 26, thus forming a guard preventing children from getting past the auxiliary gate and under the wheels 35. When the gate is fully raised, the bars and sockets are nearly fully collapsed, but as the gate is lowered, the pivoting of the bar 27 outward causes the bars 32 to be withdrawn from the sockets 33 and therefore, the auxiliary gate is extended to provide an effective barrier in front of the wheels 35 and beneath the bumper 10 so that no small child will crawl through that space into an area of considerable danger.

Figure 9:
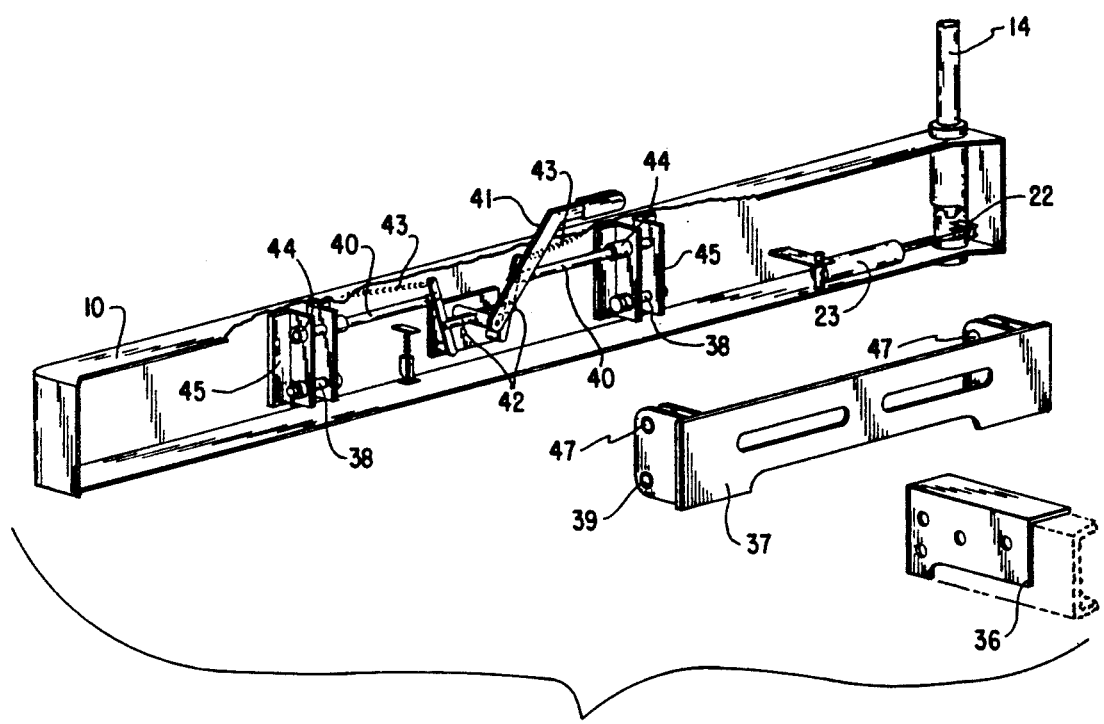
FIG. 9 is an exploded detailed view from behind the bumper of the bus to show control means for the gate.

In order to allow access to the engine of the bus, it may be necessary to provide a mechanism to allow the bumper 10 to be tilted. This mechanism is shown in FIG. 9. The bumper 10 is fastened to the frame member 36 of the bus by means of a carrier bracket 37. The rear of the bumper 10 carries a pair of pivot pins 38 adapted to be inserted through holes 39 in the bracket, thus pivotally mounting the lower edge of the bumper 10 to the frame. To hold the bumper in its vertical position, a pair of sliding pins 40 controlled by a lever 41 through links 42 is provided. Springs 43 serve to bias the pins 40 outwardly to extend through bushings 44 in brackets 45 on the bumper 10. In the upright positions, these pins 40 do extent through holes 47 in the carrier bracket 37.

Because the holes 47 are spaced substantially from the pivot holes 39, the bumper 10 and therefore, the gate will be firmly held in an upright position until it is desired to get at the engine of the bus. At that time, the bumper can be tilted forward by releasing of the pins 40 and the hood of the bus 11 will be accessible.

Figure 10:
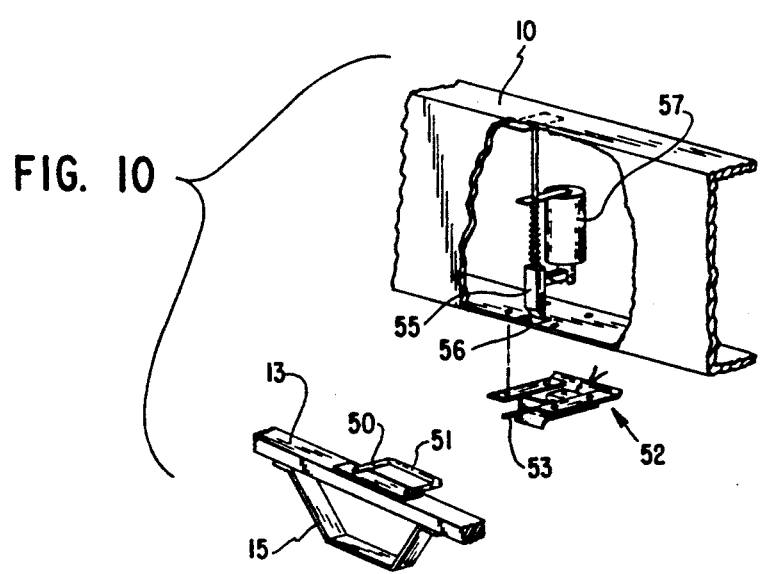
FIG. 10 is a detailed exploded view of a safety control mechanism for the gate.

It will be obvious that many safety features, interlock and warning signals should be built into such a system. One such system is illustrated in FIG. 10. Here the frame 13 is illustrated as carrying a bumper device 50 having a loop 51 adapted to serve as both a switch activating device and a latch receiver. On the bottom of the bumper 10, a switch device 52 is fastened in position to be engaged by the loop 51. When the gate is in its carried position, the loop 51 presses the activating post 53 of the switch. When the post 53 is fully pressed in, all signals may be off, or a green signal may be provided on the dash of the bus to show that the gate is in its latched position. A red signal may be used to indicate that the post 53 is extended.

At the same time, a latch bar 55 is pressed downward to extend through an opening 56 in the bumper 10 and into the loop 51 to hold the gate in its proper position. Movement of the latch bar 55 may be controlled by a hydraulic piston and cylinder device 57 or by electrical means as may be preferred.

It is also envisioned that warning flashing lights may be mounted on the upper end of the gate 12 to be either automatically controlled by the swinging out of the gate or manually from the cab of the bus. Other interlocks to prevent lowering of the gate during travel or swinging of the gate during travel may also be desirable. Other such safety features may also occur to those skilled in the art. It is apparent that a gate having added safety features has been described and shown.

I claim as my invention:

1. For use on a passenger carrying vehicle having a front bumper; a safety gate including post means mounted on said bumper, front gate means mounted for vertical movement of said post means, said front gate means being swingable from a carried position substantially parallel to said bumper to a safety position substantially parallel to said bumper, auxiliary side gate means also mounted on said post means for movement in coordination with said front gate means whereby said front gate means and said side gate means can be raised and lowered together.

2. The gate of claim 1 in which said vehicle has front wheels, said bumper being spaced ahead of said wheels, said auxiliary gate means, when lowered, being adapted to block the space between said wheels and said bumper.

3. The gate of claim 1 in which latch means is mounted on said bumper, said latch means being engageable with said front gate means to hold said front gate means releasably in said carried position.

4. The gate of claim 3 in which said bumper is tiltable forward to tilt said first gate means away from said vehicle to allow access to said front of said vehicle.

5. The gate of claim 4 in which a bumper latch means including a manually operated lever is adapted to hold said bumper in an untilted position.

6. The gate of claim 3 in which said latch means is power operated by control means from said vehicle.

7. The gate of claim 2 in which said auxiliary gate means includes a vertical member attached to said front gate means and moveable therewith, a side member pivotally mounted on said vertical member, expandable guard members between said vertical member and said side member, and means engaged between said side member and said bumper to cause said side member to pivot away from said vertical member as said gate means are lowered.

8. The gate of claim 7 in which said expandable guard members are a series of telescoping bars rivotted to both said vertical member and said side member in substantially parallel relationship to each other.

9. The gate of claim 7 in which said means engaged between said side member and said bumper includes a slide rod attached to and parallel to said side member, slide journal means pivotally attached to said bumper, said slide rod being slidably journalled in said journal means.

* * * * *